(12) United States Patent
Oakes, III et al.

(10) Patent No.: US 7,876,949 B1
(45) Date of Patent: *Jan. 25, 2011

(54) SYSTEMS AND METHODS FOR REMOTE DEPOSIT OF CHECKS

(75) Inventors: Charles Lee Oakes, III, San Antonio, TX (US); Randy Ray Morlen, San Antonio, TX (US); R. Bharat Prasad Nuggehalli, San Antonio, TX (US); Greg Alan Harpel, San Antonio, TX (US); Michael Frank Morris, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 877 days.

This patent is subject to a terminal disclaimer.

(21) Appl. No.: 11/591,025

(22) Filed: Oct. 31, 2006

(51) Int. Cl.
*G06K 9/00* (2006.01)
*G06F 17/00* (2006.01)

(52) U.S. Cl. .................. 382/137; 382/176; 235/379

(58) Field of Classification Search .......... 382/112, 382/113, 115, 116, 135, 137, 138, 139, 140, 382/155, 168, 181, 182, 187, 190–203, 232, 382/260, 274, 276, 287, 294, 295, 305, 320, 382/321, 176; 709/219; 235/379; 705/45, 705/64, 21
See application file for complete search history.

(56) References Cited

U.S. PATENT DOCUMENTS

| | | | |
|---|---|---|---|
| 3,341,820 A | 9/1967 | Grillmeier | |
| 3,576,972 A | 5/1971 | Wood | |
| 3,593,913 A | 7/1971 | Bremer | |
| 3,620,553 A | 11/1971 | Donovan | |
| 3,648,242 A | 3/1972 | Grosbard | |
| 3,816,943 A | 6/1974 | Henry | |
| 4,002,356 A | 1/1977 | Weidmann | |
| 4,060,711 A | 11/1977 | Buros | |
| 4,128,202 A | 12/1978 | Buros | |
| 4,136,471 A | 1/1979 | Austin | |
| 4,205,780 A | 6/1980 | Burns | |
| 4,264,808 A | 4/1981 | Owens et al. | |
| 4,305,216 A | 12/1981 | Skelton | |
| 4,321,672 A | 3/1982 | Braun | |

(Continued)

FOREIGN PATENT DOCUMENTS

EP 0984410 3/2000

OTHER PUBLICATIONS

White, J.M. et ai, "ImageThreshoulding for Optical Character Recognition and Other Applications Requiring Character Image Extraction", IBM J. Res. Develop, 1983, vol. 27.

(Continued)

*Primary Examiner*—Seyed Azarian
(74) *Attorney, Agent, or Firm*—Chadbourne & Parke LLP; Walter G. Hanchuk

(57) ABSTRACT

Remote deposit of checks can be facilitated by a financial institution. A customer's general purpose computer and image capture device may be leveraged to capture an image of a check and deliver the image to financial institution electronics. Additional data for the transaction may be collected as necessary. The transaction can be automatically accomplished utilizing the images and data thus acquired.

24 Claims, 6 Drawing Sheets

U.S. PATENT DOCUMENTS

| | | |
|---|---|---|
| 4,523,330 A | 6/1985 | Cain |
| 4,636,099 A | 1/1987 | Goldstone |
| 4,640,413 A | 2/1987 | Kaplan |
| 4,644,144 A | 2/1987 | Chandek |
| 4,722,444 A | 2/1988 | Murphy |
| 4,727,435 A | 2/1988 | Otani |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Gustin |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton et al. |
| 4,975,735 A | 12/1990 | Bright |
| 5,022,683 A | 6/1991 | Barbour |
| 5,053,607 A | 10/1991 | Carlson et al. |
| 5,157,620 A | 10/1992 | Shaar |
| 5,159,548 A | 10/1992 | Caslavka |
| 5,191,525 A | 3/1993 | LeBrun |
| 5,220,501 A | 6/1993 | Lawlor et al. |
| 5,237,159 A | 8/1993 | Stephens |
| 5,265,008 A | 11/1993 | Benton et al. |
| 5,321,816 A | 6/1994 | Rogan |
| 5,350,906 A | 9/1994 | Brody |
| 5,373,550 A | 12/1994 | Campbell et al. |
| 5,419,588 A | 5/1995 | Wood |
| 5,422,467 A | 6/1995 | Graef |
| 5,504,538 A | 4/1996 | Tsujihara |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,668,897 A | 9/1997 | Stolfo |
| 5,673,320 A | 9/1997 | Ray |
| 5,677,955 A | 10/1997 | Doggett et al. |
| 5,679,938 A | 10/1997 | Templeton et al. |
| 5,680,611 A | 10/1997 | Rail |
| 5,691,524 A | 11/1997 | Josephson |
| 5,737,440 A | 4/1998 | Kunkler |
| 5,751,842 A | 5/1998 | Riach et al. |
| 5,830,609 A | 11/1998 | Warner et al. |
| 5,832,463 A | 11/1998 | Funk |
| 5,863,075 A | 1/1999 | Rich |
| 5,870,456 A | 2/1999 | Rogers |
| 5,870,724 A | 2/1999 | Lawlor et al. |
| 5,878,337 A | 3/1999 | Joao |
| 5,897,625 A | 4/1999 | Gustin et al. |
| 5,903,878 A | 5/1999 | Talati |
| 5,903,881 A | 5/1999 | Schrader |
| 5,910,988 A | 6/1999 | Ballard .................. 705/75 |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin |
| 6,012,048 A | 1/2000 | Gustin |
| 6,021,202 A | 2/2000 | Anderson |
| 6,029,887 A | 2/2000 | Furuhashi |
| 6,030,000 A | 2/2000 | Diamond |
| 6,032,137 A | 2/2000 | Ballard .................. 705/75 |
| 6,038,553 A | 3/2000 | Hyde |
| 6,073,119 A | 6/2000 | Bornemisza-Wahr |
| 6,085,168 A | 7/2000 | Mori |
| 6,097,834 A | 8/2000 | Krouse |
| 6,097,885 A | 8/2000 | Rayner |
| 6,105,865 A | 8/2000 | Hardesty |
| 6,145,738 A | 11/2000 | Stinson |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,199,055 B1 | 3/2001 | Kara |
| 6,243,689 B1 | 6/2001 | Norton |
| 6,278,983 B1 | 8/2001 | Ball |
| 6,282,826 B1 | 9/2001 | Richards |
| 6,304,860 B1 | 10/2001 | Martin, Jr. |
| 6,314,452 B1 | 11/2001 | Dekel |
| 6,317,727 B1 | 11/2001 | May |
| 6,339,658 B1 | 1/2002 | Moccagatta |
| 6,363,164 B1 | 3/2002 | Jones |
| 6,390,362 B1 | 5/2002 | Martin |
| 6,397,196 B1 | 5/2002 | Kravetz |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,449,397 B1 | 9/2002 | Che-Chu |
| 6,450,403 B1 | 9/2002 | Martens et al. ............. 235/379 |
| 6,464,134 B1* | 10/2002 | Page ......................... 235/379 |
| 6,470,325 B1 | 10/2002 | Leemhuis |
| 6,505,178 B1 | 1/2003 | Flenley |
| 6,574,609 B1 | 6/2003 | Downs |
| 6,578,760 B1 | 6/2003 | Otto |
| 6,587,837 B1 | 7/2003 | Spagna |
| 6,609,200 B2 | 8/2003 | Anderson |
| 6,643,416 B1 | 11/2003 | Daniels |
| 6,661,910 B2 | 12/2003 | Jones |
| 6,672,452 B1 | 1/2004 | Alves |
| 6,682,452 B1 | 1/2004 | Quintus |
| 6,695,204 B1 | 2/2004 | Stinson |
| 6,726,097 B2 | 4/2004 | Graef |
| 6,728,397 B2 | 4/2004 | McNeal |
| 6,742,128 B1 | 5/2004 | Joiner |
| 6,755,340 B1 | 6/2004 | Voss |
| 6,781,962 B1 | 8/2004 | Williams |
| 6,786,398 B1 | 9/2004 | Stinson |
| 6,789,054 B1 | 9/2004 | Makhlouf |
| 6,829,704 B2 | 12/2004 | Zhang |
| 6,844,885 B2 | 1/2005 | Anderson et al. |
| 6,856,965 B1* | 2/2005 | Stinson et al. ................ 705/21 |
| 6,883,140 B1 | 4/2005 | Acker et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,993,507 B2 | 1/2006 | Meyer |
| 6,996,263 B2 | 2/2006 | Jones |
| 6,999,943 B1 | 2/2006 | Johnson et al. |
| 7,004,382 B2 | 2/2006 | Sandru |
| 7,010,507 B1 | 3/2006 | Anderson et al. |
| 7,016,704 B2 | 3/2006 | Pallakoff |
| 7,039,048 B1 | 5/2006 | Monta |
| 7,062,768 B2 | 6/2006 | Kubo |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,181,430 B1 | 2/2007 | Buchanan et al. |
| 7,197,173 B2 | 3/2007 | Jones |
| 7,200,255 B2 | 4/2007 | Jones |
| 7,216,106 B1 | 5/2007 | Buchanan et al. |

| | | | | | |
|---|---|---|---|---|---|
| 7,249,076 B1 | 7/2007 | Pendleton | 2003/0167225 A1 | 9/2003 | Adams |
| 7,290,034 B2 | 10/2007 | Budd | 2003/0191615 A1 | 10/2003 | Bailey |
| 7,299,970 B1 | 11/2007 | Ching | 2003/0191869 A1 | 10/2003 | Williams |
| 7,299,979 B2 | 11/2007 | Phillips | 2003/0200174 A1 | 10/2003 | Star |
| 7,313,543 B1 | 12/2007 | Crane | 2004/0010466 A1 | 1/2004 | Anderson |
| 7,321,874 B2 | 1/2008 | Dilip | 2004/0012496 A1 | 1/2004 | De Souza |
| 7,321,875 B2 | 1/2008 | Dilip | 2004/0024626 A1 | 2/2004 | Bruijning |
| 7,325,725 B2 | 2/2008 | Foss | 2004/0024708 A1 | 2/2004 | Masuda |
| 7,343,320 B1 | 3/2008 | Treyz | 2004/0057697 A1 | 3/2004 | Renzi |
| 7,349,566 B2 | 3/2008 | Jones | 2004/0058705 A1 | 3/2004 | Morgan |
| 7,377,425 B1 | 5/2008 | Ma | 2004/0066031 A1 | 4/2004 | Wong |
| 7,379,978 B2 * | 5/2008 | Anderson et al. ............ 709/219 | 2004/0069841 A1 | 4/2004 | Wong |
| 7,385,631 B2 | 6/2008 | Maeno | 2004/0078299 A1 | 4/2004 | Down-Logan |
| 7,386,511 B2 | 6/2008 | Buchanan | 2004/0080795 A1 | 4/2004 | Bean |
| 7,391,897 B2 | 6/2008 | Jones | 2004/0093303 A1 | 5/2004 | Picciallo |
| 7,391,934 B2 | 6/2008 | Goodall | 2004/0093305 A1 | 5/2004 | Kight |
| 7,392,935 B2 * | 7/2008 | Byrne et al. ................. 235/379 | 2004/0103296 A1 | 5/2004 | Harp |
| 7,421,107 B2 * | 9/2008 | Lugg .......................... 382/139 | 2004/0109596 A1 | 6/2004 | Doran |
| 7,440,924 B2 * | 10/2008 | Buchanan et al. ............. 705/45 | 2004/0122754 A1 | 6/2004 | Stevens |
| 7,447,347 B2 | 11/2008 | Weber | 2004/0138974 A1 | 7/2004 | Shimamura |
| 7,460,108 B2 | 12/2008 | Tamura | 2004/0148235 A1 | 7/2004 | Craig |
| 7,461,779 B2 | 12/2008 | Ramachandran | 2004/0158549 A1 | 8/2004 | Matena |
| 7,461,780 B2 | 12/2008 | Potts | 2004/0165096 A1 | 8/2004 | Maeno |
| 7,477,923 B2 | 1/2009 | Wallmark | 2004/0170259 A1 | 9/2004 | Park |
| 7,480,382 B2 | 1/2009 | Dunbar | 2004/0210515 A1 | 10/2004 | Hughes |
| 7,489,953 B2 | 2/2009 | Griffin | 2004/0236647 A1 | 11/2004 | Acharya |
| 7,490,242 B2 | 2/2009 | Torres | 2004/0236688 A1 | 11/2004 | Bozeman |
| 7,497,429 B2 | 3/2009 | Reynders | 2004/0245324 A1 | 12/2004 | Chen |
| 7,506,261 B2 | 3/2009 | Satou | 2004/0252679 A1 | 12/2004 | Williams |
| 7,512,564 B1 | 3/2009 | Geer | 2004/0260636 A1 | 12/2004 | Marceau et al. |
| 7,536,440 B2 | 5/2009 | Budd | 2004/0267666 A1 | 12/2004 | Minami |
| 7,548,641 B2 | 6/2009 | Gilson | 2005/0033645 A1 | 2/2005 | Duphily |
| 7,609,873 B2 | 10/2009 | Foth | 2005/0033685 A1 | 2/2005 | Reyes |
| 7,620,231 B2 | 11/2009 | Jones | 2005/0033695 A1 | 2/2005 | Minowa |
| 7,647,275 B2 | 1/2010 | Jones | 2005/0038754 A1 | 2/2005 | Geist |
| 7,672,940 B2 | 3/2010 | Viola | 2005/0044042 A1 | 2/2005 | Mendiola |
| 7,702,588 B2 | 4/2010 | Gilder | 2005/0044577 A1 | 2/2005 | Jerding |
| 2001/0014881 A1 | 8/2001 | Drummond | 2005/0049950 A1 | 3/2005 | Shimamura |
| 2001/0018739 A1 | 8/2001 | Anderson | 2005/0075969 A1 | 4/2005 | Nielson et al. |
| 2001/0027994 A1 | 10/2001 | Hayashida | 2005/0078336 A1 | 4/2005 | Ferlitsch |
| 2001/0042171 A1 | 11/2001 | Vermeulen | 2005/0086140 A1 | 4/2005 | Ireland |
| 2001/0043748 A1 | 11/2001 | Wesolkowski | 2005/0086168 A1 | 4/2005 | Alvarez |
| 2001/0047330 A1 | 11/2001 | Gephart | 2005/0091161 A1 | 4/2005 | Gustin |
| 2001/0054020 A1 | 12/2001 | Barth | 2005/0096992 A1 | 5/2005 | Geisel |
| 2002/0001393 A1 | 1/2002 | Jones | 2005/0097046 A1 | 5/2005 | Singfield |
| 2002/0016763 A1 | 2/2002 | March | 2005/0108164 A1 | 5/2005 | Salafia |
| 2002/0032656 A1 | 3/2002 | Chen | 2005/0108168 A1 | 5/2005 | Halpin |
| 2002/0052841 A1 | 5/2002 | Guthrie | 2005/0131820 A1 | 6/2005 | Rodriguez |
| 2002/0052853 A1 | 5/2002 | Munoz | 2005/0149436 A1 | 7/2005 | Elterich |
| 2002/0065786 A1 | 5/2002 | Martens et al. ............... 705/70 | 2005/0168566 A1 | 8/2005 | Tada |
| 2002/0072974 A1 | 6/2002 | Pugliese | 2005/0171899 A1 | 8/2005 | Dunn |
| 2002/0075524 A1 | 6/2002 | Blair | 2005/0171907 A1 | 8/2005 | Lewis |
| 2002/0084321 A1 | 7/2002 | Martens | 2005/0177499 A1 | 8/2005 | Thomas |
| 2002/0116329 A1 | 8/2002 | Serbetcioglu | 2005/0177518 A1 | 8/2005 | Brown |
| 2002/0118891 A1 | 8/2002 | Rudd | 2005/0182710 A1 | 8/2005 | Andersson |
| 2002/0120562 A1 | 8/2002 | Opiela | 2005/0188306 A1 | 8/2005 | Mackenzie |
| 2002/0138522 A1 | 9/2002 | Muralidhar | 2005/0209961 A1 | 9/2005 | Michelsen |
| 2002/0147798 A1 | 10/2002 | Huang | 2005/0228733 A1 | 10/2005 | Bent |
| 2002/0150279 A1 | 10/2002 | Scott | 2005/0252955 A1 | 11/2005 | Sugai |
| 2002/0152161 A1 | 10/2002 | Aoike | 2005/0267843 A1 | 12/2005 | Acharya et al. |
| 2002/0152164 A1 | 10/2002 | Dutta | 2005/0269412 A1 | 12/2005 | Chiu |
| 2002/0152169 A1 * | 10/2002 | Dutta et al. ................... 705/45 | 2005/0278250 A1 | 12/2005 | Zair |
| 2002/0171820 A1 | 11/2002 | Okamura | 2005/0281471 A1 | 12/2005 | LeComte |
| 2002/0178112 A1 | 11/2002 | Goeller et al. | 2005/0289030 A1 | 12/2005 | Smith |
| 2003/0005326 A1 | 1/2003 | Flemming | 2006/0004660 A1 | 1/2006 | Pranger |
| 2003/0023557 A1 | 1/2003 | Moore | 2006/0025697 A1 | 2/2006 | Kurzweil |
| 2003/0038227 A1 | 2/2003 | Sesek | 2006/0039629 A1 | 2/2006 | Li |
| 2003/0055756 A1 | 3/2003 | Allan | 2006/0047593 A1 | 3/2006 | Naratil |
| 2003/0055776 A1 | 3/2003 | Samuelson | 2006/0053056 A1 | 3/2006 | Alspach-Goss |
| 2003/0075916 A1 | 4/2003 | Gorski | 2006/0059085 A1 | 3/2006 | Tucker |
| 2003/0081824 A1 | 5/2003 | Mennie | 2006/0080245 A1 | 4/2006 | Bahl |
| 2003/0105688 A1 | 6/2003 | Brown | 2006/0085357 A1 * | 4/2006 | Pizarro ....................... 705/64 |
| 2003/0139999 A1 | 7/2003 | Rowe | 2006/0102704 A1 | 5/2006 | Reynders |

| | | |
|---|---|---|
| 2006/0106691 A1 | 5/2006 | Sheaffer |
| 2006/0106717 A1 | 5/2006 | Randle et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu |
| 2006/0118613 A1 | 6/2006 | McMann |
| 2006/0144924 A1 | 7/2006 | Stover |
| 2006/0144950 A1 | 7/2006 | Johnson |
| 2006/0161501 A1 | 7/2006 | Waserstein |
| 2006/0206506 A1 | 9/2006 | Fitzpatrick |
| 2006/0214940 A1 | 9/2006 | Kinoshita |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson et al. |
| 2006/0242063 A1 | 10/2006 | Peterson et al. |
| 2006/0249567 A1 | 11/2006 | Byrne et al. |
| 2006/0279628 A1 | 12/2006 | Fleming |
| 2006/0282383 A1 | 12/2006 | Doran |
| 2007/0016796 A1 | 1/2007 | Singhal |
| 2007/0019243 A1 | 1/2007 | Sato |
| 2007/0022053 A1 | 1/2007 | Waserstein |
| 2007/0031022 A1 | 2/2007 | Frew |
| 2007/0050292 A1 | 3/2007 | Yarbrough |
| 2007/0058851 A1 | 3/2007 | Quine |
| 2007/0063016 A1 | 3/2007 | Myatt |
| 2007/0075772 A1 | 4/2007 | Kokubo |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth et al. |
| 2007/0086643 A1 | 4/2007 | Spier |
| 2007/0094088 A1 | 4/2007 | Mastie |
| 2007/0100748 A1 | 5/2007 | Dheer |
| 2007/0129955 A1 | 6/2007 | Dalmia |
| 2007/0136198 A1 | 6/2007 | Foth |
| 2007/0140594 A1 | 6/2007 | Franklin |
| 2007/0143208 A1 | 6/2007 | Varga |
| 2007/0156438 A1 | 7/2007 | Popadic et al. |
| 2007/0168265 A1 | 7/2007 | Rosenberger |
| 2007/0171288 A1 | 7/2007 | Inoue |
| 2007/0194102 A1 | 8/2007 | Cohen et al. |
| 2007/0203708 A1 | 8/2007 | Polcyn |
| 2007/0235520 A1 | 10/2007 | Smith |
| 2007/0241179 A1 | 10/2007 | Davis et al. |
| 2007/0244782 A1 | 10/2007 | Chimento |
| 2007/0251992 A1 | 11/2007 | Sharma |
| 2007/0255652 A1 | 11/2007 | Tumminaro |
| 2007/0255653 A1 | 11/2007 | Tumminaro |
| 2007/0258634 A1 | 11/2007 | Simonoff |
| 2007/0278286 A1 | 12/2007 | Crowell |
| 2007/0288380 A1 | 12/2007 | Starrs |
| 2007/0288382 A1 | 12/2007 | Narayanan |
| 2008/0002911 A1 | 1/2008 | Eisen |
| 2008/0021802 A1 | 1/2008 | Pendleton |
| 2008/0040280 A1 | 2/2008 | Davis |
| 2008/0052182 A1 | 2/2008 | Marshall |
| 2008/0059376 A1 | 3/2008 | Davis et al. |
| 2008/0063253 A1 | 3/2008 | Wood |
| 2008/0071721 A1 | 3/2008 | Wang et al. |
| 2008/0080760 A1 | 4/2008 | Ronca et al. |
| 2008/0086421 A1 | 4/2008 | Gilder |
| 2008/0119178 A1 | 5/2008 | Peddireddy |
| 2008/0133411 A1 | 6/2008 | Jones |
| 2008/0156438 A1 | 7/2008 | Stumphauzer |
| 2008/0247629 A1 | 10/2008 | Gilder |
| 2008/0249931 A1 | 10/2008 | Gilder |
| 2009/0108080 A1 | 4/2009 | Meyer |
| 2009/0141962 A1 | 6/2009 | Borgia |
| 2009/0171825 A1 | 7/2009 | Roman |
| 2009/0173781 A1 | 7/2009 | Ramachandran |
| 2009/0252437 A1 | 10/2009 | Li |
| 2009/0281904 A1 | 11/2009 | Pharris |
| 2009/0313167 A1 | 12/2009 | Dujari |
| 2010/0007899 A1 | 1/2010 | Lay |

OTHER PUBLICATIONS

Ritzer, J.R. "Hinky Dinky helped spearhead POS, remote banking movement", Bank System & Equipment, vol. 21, No. 12 pp. 51-54, Dec. 1984.

Dinan, R.F. Dinan et al., "ImagePlus High Performance Transaction System", IBM Systems Journal; 1990, pp. 431-434; vol. 29, No. 3.

Gupta, Amar et al., "An Integrated Architecture for Recognition of Totally Unconstrained Handwritten Numerals"; International Journal of Pattern Recognition and Artificial Intelligence; 1993, pp. 757-773; vol. 7, No. 4.

Masonson, L. "Check truncation and ACH trends—automated clearing houses," healthcare financial management association, http://WWN.findarticles.com/p/articles/mLm3276/is_n7_v47/ai_14466034/print, 1993.

Zhang, C.Y., "Robust Estimation and Image Combining," Astronomical Data Analysis Software and Systems IV, ASP Conference Series, 1995.

Kornai Andras et al., "Recognition of Cursive Writing on Personal Checks," Proceedings of International Workshop on the Frontiers in Handwriting Recognition, Sep. 1996, pp. 1-6.

De Queiroz, Ricardo et al., "Mixed RasterContent (MRC) Model for Compound Image Compression", pp. 1-12.

J.D. Tygar, Atomicity in Electronic Commerce, Apr./May 1998 (Atomicity).

Anderson, Milton M. "FSML and Echeck", Financial Services Technology Consortium, 1999.

"Full Service Direct Deposit," www.nonprofitstaffing.com/images/upload/dirdepform.pdf, 2001.

Rose, Sarah et al., "Best of the Web": The Top 50 Financial Websites. Money, New York Dec. 1999, vol. 28, iss12; pp. 178-187.

Middleware', URL: http://www.cs.umanitoba.ca/maheswar/anc2002/PAPERS/bak01.pdf, Jun. 24, 2008.

Palacios, Rafael et al., "Automatic Processing of Brazilian Bank Checks", Machine Vision and Applications; 2002, pp. 1-28.

Peter, J. Wallison, "Wal-Mart Case Exposes Flaws in Banking-Commerce Split", American Banker, vol. 167. No. 8, Jan. 17, 2002.

Heckenberg, D., "Using Mac OSX for Real-Time Image Processing," 2003.

Burnett, J., "Depository Bank Endorsement Requirements," Bankersonline.com, http://www.bankersonline.com/cgi-ban/printview.pl, 2003.

Blafore, Bonnie, "Lower Commissions, Fewer Amenities." Better Investing. Madison Heights: Feb. 2003, vol. 52, iss 6; pp. 50-51.

"Direct Deposit Authorization Form" www.umass.edu/humres/library/DDForm.pdf, 2003.

Electronic Billing Problem: The E-check is in the mail-American Banker-v168, n 95, 91, May 2003.

Knestout, Brian P. et al., "Banking Made Easy" Kiplinger's Personal Fiance, Washington: Jul. 2003, vol. 57 iss 7; pp. 44-47.

Mohl, Bruce, "Banks Reimbursing ATM Fee to Compete With Larger Rivals." Boston Globe, Boston, MA., Sep. 2004, pp. 1E.

"Two Words Every Business Should Know: Remote Deposit," Canon, http://www.rpsolutions.com/rpweb.pdfs/ canon_rdc.pdf, 2005.

Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universtat des Saari andes, Saarbrucken, im Jul. 2005.

Onlinecheck.com/Merchant Advisors, "real-Time Check Debit", Merchant Advisors: Retail Check Processing Check Conversion, http://www.onlinecheck/wach/rcareal.htm, 2006.

"Compliance with Regulation CC," http://www/federalreserve.org/Pubsregccregcee.htm, Jan. 24, 2006, 6 pgs.

Federal Reserve Board, "Check Clearing for the 21st Century Act," FRB, http://www.federalreserve.gov/paymentsystems/turncation/, 2006.

BankServ Press release, "BankServ Announces New Remote Deposit Product Integrated With QuickBooks", San Francisco, Jul. 6, 2006, Remotedepositcapture.com, pp. 1-3.

Dias, Danilo et al., "A Model for the Electronic Representation of Bank Checks", Universidade de Brasilia.

Leaning, Jeffrey Scott (Reg. No. 51,184); "Remarks and Conclusion" in Response to Office Action mailed Nov. 27, 2007; Response submitted to the USPTO on Feb. 20, 2008; U.S. Appl. No. 09/506,434, filed Feb. 18, 2000; 6 pages.

Shelby, Hon. Richard. C. (Chairman, Committee on Banking, Housing and Urban Affairs); "Check Truncation Act of 2003", Calendar No. 168, 108th Congress, 1st Session Senate Report 108-79. Jun. 25, 2003. 9 pages.

Public Law 108-100—108th Congress; "An Act—Check Clearing for the 21st Century Act", Oct. 28, 2003 [H.R. 1474], 117 STAT. 1177, 12 USC 5001. 18 pages.

Johnson, Jennifer J., Secretary of the Board; Federal Reserve System, 12 CFR Part 229, Regulation CC; "Availability of Funds and Collection of Checks", downloaded 2009, pp. 1-89.

Oxley, Michael G., from the committee of conference; "Check Clearing for the 21st Century Act", 108th Congress—1st Session, House of Representatives, Report 108-291. Oct. 1, 2003 -ordered to be printed. [To accompany H.R. 1474]. pp. 1-27.

Oxley, Michael G., from the Committee on Financial Services; "Check Clearing for the 21st Century Act", 108th Congress—1st Session, House of Representatives, Report 108-132. Jun. 2, 2003. [To accompany H. R. 1474]. pp. 1-20.

Board of Governors of the Federal Reserve System, "Report to Congress on the Check Clearing for the 21st Century Act of 2003", Apr. 2007, Submitted to the Congress pursuant to section 16 of the Check Clearing for the 21st Century Act of 2003. 59 pages.

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998. 41 pages.

Craig, Ben; "Resisting Electronic Payment Systems: Burning Down the House?", Federal Reserve Bank of Cleveland, Jul. 1999, 4 pages.

Furst, Karen et al., "Internet Banking: Developments and Prospects", Office of the Comptroller of the Currency -Economic and Policy Analysis Working Paper 2000-9, Sep. 2000.

Wells Fargo—2005 News Releases, "The New Wells Fargo Electronic Deposit Services Break Through Banking Boundaries in the Age of Check 21", San Francisco—Mar. 28, 2005. Retrieved from the internet <https://www.wellsfargo.com/press/3282005_Check21?year=2005>.

Constanzo, Chris. "Remote Check Deposit: Wells Captures a New Checking Twist", Bank Technology News Article—May 2005. Retrieved from the internet <https://www.americanbankercom/btn_article.html?id=20050502YQ50FSYG>. 2 pages.

Credit Union Journal, "AFCU Averaging 80 DepositHome Transactions Per Day", Credit Union Journal -Monday, Aug. 15, 2005. 1 page.

Bank Systems & Technology, Untitled Article, May 1, 2006. Retrieved from the internet <https://www.banktech.com/showArticle.jhtml?articleID=I87003126>. pp. 1-4. Copyright 2004-2005 CMP Media, LLC.

Digital Transactions News, "An ACH-Image Proposal for Checks Roils Banks and Networks", May 26, 2006. 3 pages.

BankServ Press Release, "BankServ Announces New Remote Deposit Product Integrated With QuickBooks", San Francisco, Jul. 6, 2006. Retrieved from RemoteDepositCapture.com. pp. 1-3.

Remote Deposit Capture News Article, "PNC Bank to Offer Ease of Online Deposit Service Integrated with QuickBooks to Small Businesses", Remote Deposit Capture News Articles from Jul. 24, 2006. Retrieved from RemoteDepositCapture.com. pp. 1-2.

Association of German Banks, SEPA 2008: Uniform Payment Instruments for Europe, Berlin, Jul. 2007. Publisher: Bundesverband deutscher Banken e. V.

DCU Member's Monthly—Jan. 2008, "PC Deposit—Deposit Checks from Home!", Retrieved from the internet <https://www.mycreditunionnewsletter.com/dcu/0108/pageI.html>. pp. 1-2. Copyright 2008 Digital Federal Credit Union.

WindowsForDevices.com, "Software lets camera phone users deposit checks, pay bills", Jan. 29, 2008. Retrieved from the internet <https://www.windowsfordevices.com/news/NS3934956670html>. 3 pages.

CNN.com/technology, "Scan, deposit checks from home", Feb. 7, 2008. Retrieved from the internet <https://www.cnn.com/2008/TECH/biztech/02/07/check.scanning.ap/index.html>. downloaded 2009, 3 pages.

eCU Technologies, "Upost Remote Deposit Solution", Retrieved from the internet <https://www.eutechnologies.com/products/upost.html>. downloaded 2009, 1 page.

The Green Sheet 2.0 :: Newswire, "CO-OP adds home deposit capabilities to suite of check imaging products", Retrieved from the internet, downloaded 2009, <https://www.greensheet.com/newswire.php?newswire_id=8799. pp. 1-2.

CreativePaymentSolutions.com, "Creative Payment Solutions—WebSolution", Retrieved from the internet <http://www.creativepaymentsolutions.com/cps/financial_services/websolution/default.html>. Copyright © 2008, Creative Payment Solutions, Inc.

Wells Fargo Commercial, "Remote Deposit", Retrieved from the internet <https://www.wellsfargo.com/com/treasury_mgmt/receivables/electronic/remote_deposit>. © 1999-2008 Wells Fargo. All rights reserved.

Bruene, Jim; "Digital Federal Credit Union and Four Others Offer Consumer Remote Deposit Capture Through EasCorp", NetBanker—Tracking Online Finance. Apr. 13, 2008 9:23 PM. Retrieved from the internet <http://www.netbanker.com/2008/04/digital_federal_credit_union_a.html> © 1995-2007, Financial Insite, Inc.

Credit Union Journal, "The Ramifications of Remote Deposit Capture Success", Credit Union Journal—Monday, Apr. 14, 2008. Retrieved from the internet <http://www.cujournal.com/printthis.html?id=20080411E0DZT57G>. 1 page.

Bruene, Jim; "CheckFree to Enable In-home Remote Check Deposits for Consumers and Small Businesses", NetBanker.com, Feb. 5, 2008 12:23 PM. Retrieved from the internet <http://www.netbanker.com/2008/02/checkfree_to_enable_inhome_rem.html>. © 1995-2007, Financial Insite, Inc.

Mitek systems, "ImageNet Mobile Deposit—Provides Convenient Check Deposit and Bill Pay to Mobile Consumers", <http://www.miteksystems.com>. downloaded 2009, 2 pages.

Chiang, Chuck Chiang / The Bulletin, "Remote banking offered", Published: Feb. 1, 2006 4:00AM PST. Retrieved from the internet <http://bendbulletin.com/apps/pbcs.dll/article?AID=/20060201/BIZ0102/602010327&templ...>. 2 pages.

fBankServ, "DepositNow: What's the difference?", Copyright 2006, DepositNow.

http://www.bankserv.com/products/remotedeposit.htm, Copyright 2006, BankServ.

Website: RemoteDepositCapture.com, URL: www.RemoteDepositCapture.com/, 2006, 5 pages.

Federal Check 21 Act, "New Check 21 Act Effective Oct. 28, 2004: Banks No Longer Will Return Original Cancelled Checks," Consumer Union's FAQ's and Congressional Testimony on Check 21, www.consumerlaw.org/initiatives/content/check21_content.html, downloaded Dec. 2005, 20 pages.

The Automated Clearinghouse, "Retail Payment Systems; Payment Instruments, Clearing and Settlement; The Automated Clearinghouse (ACH)," www.ffiec.gov/ffiecinfobase/booklets/Retail/retail_02d.html, downloaded Dec. 2005, 3 pages.

Fest, G., "Patently Unaware," *Bank Technology News*, Apr. 2006, Retrieved from the Internet at URL: http://banktechnews.com/article.html?id=20060403T7612618, 5 pages.

Website: Blue Mountain Consulting, URL: www.bluemountainconsulting.com/, Downloaded Apr. 26, 2006, 3 pages.

Affinity Federal Credit Union, "Affinity announces online depsoit," Aug. 4, 2005, Affinity Federal Credit Union.

"check 21-The check is not in the post", RedTitan Technology 2004./ http://www.redtitan.com/check2i/htm, 3 pgs.

Hartly, Thomas, "Banks Check Out New Image", Business First, Buffalo: Jul. 16, 2004, vol. 20 Iss 43, pg1 , 3 pages.

Wade, Will, "Early Notes: Updating Consumers on Check 21" American Banker Aug. 10, 2004 (3 pages).

Leaning, Jeffrey Scott (Reg. No. 51,184); "Remarks and Conclusion" in Response to Office Action mailed Nov. 27, 2007; Response submitted to the USPTO on 20 Feb. 2008; United States Patent Application No. 09/506,434 filed Feb. 18, 2000; 6 pages.

Shelby, Hon. Richard C. (Chairman, Committee on Banking, Housing and Urban Affairs); "Check Truncation Act of 2003", Calendar No. 168, 108th Congress, 1st Session Senate Report 108-79. Jun. 25, 2003. 9 pages.

Public Law 108-100 - 108th Congress; "An Act—Check Clearing for the 21st Century Act", Oct. 28, 2003 [H.R. 1474], 117 Stat. 1177,12 USC 5001. 18 pages.

Johnson, Jennifer J., Secretary of the Board; Federal Reserve System, 12 CFR Part 229, Regulation CC; Docket No. R-1176, "Availability of Funds and Collection of Checks", downloaded 2009, pp. 1-89.

Oxley, Michael G., from the committee of conference; "Check Clearing for the 21st Century Act", 108th Congress - 1st Session, House of Representatives, Report 108-291. Oct. 1, 2003 -ordered to be printed. [To accompany H.R. 1474]. pp. 1-27.

Oxley, Michael G., from the Committee on Financial Services; "Check Clearing for the 21st Century Act", 108th Congress - 1st Session, House of Representatives, Report 108-132. Jun. 2, 2003. [To accompany H. R. 1474]. pp. 1-20.

Board of Governors of the Federal Reserve System, "Report to Congress on the Check Clearing for the 21st Century Act of 2003", Apr. 2007, Submitted to the Congress pursuant to section 16 of the Check Clearing for the 21st Century Act of 2003. 59 pages.

Rivlin, Alice M. et al., Chair, Vice Chair - Board of Governors, Committee on the Federal Reserve in the Payments Mechanism - Federal Reserve System, "The Federal Reserve in the Payments Mechanism", Jan. 1998. 41 pages.

Craig, Ben; "Resisting Electronic Payment Systems: Burning Down the House?", Federal Reserve Bank of Cleveland, Jul. 1999, 4 pages.

Furst, Karen et al., "Internet Banking: Developments and Prospects", Office of the Comptroller of the Currency -Economic and Policy Analysis Working Paper 2000-9, Sep. 2000.

Wells Fargo - 2005 News Releases, "The New Wells Fargo Electronic Deposit Services Break Through Banking Boundaries In the Age of Check 21", San Francisco - Mar. 28, 2005. Retrieved from the internet <https://www.wellsfargo.com/press/3282005_Check21?year=2005>.

Constanzo, Chris. "Remote Check Deposit: Wells Captures A New Checking Twist", Bank Technology News Article - May 2005. Retrieved from the internet <https://www.americanbankercom/btn_article.html?id=20050502YQ5OFSYG>. 2 pages.

Credit Union Journal, "AFCU Averaging 80 DepositHome Transactions Per Day", Credit Union Journal -Monday, Aug. 15, 2005. 1 page.

Bank Systems & Technology, Untitled Article, May 1, 2006. Retrieved from the internet <https://www.banktech.com/showArticle.jhtml?articleID=I87003126>. pp. 1-4. Copyright 2004-2005 CMP Media, LLC.

Digital Transactions News, "An ACH-Image Proposal For Checks Roils Banks And Networks", May 26, 2006. 3 pages.

BankServ Press Release, "BankServ Announces New Remote Deposit Product Integrated With QuickBooks", San Francisco, Jul. 6, 2006. Retrieved from RemoteDepositCapture.com. pp. 1-3.

Remote Deposit Capture News Article, "PNC Bank to Offer Ease of Online Deposit Service Integrated with QuickBooks to Small Businesses", Remote Deposit Capture News Articles from Jul. 24, 2006. Retrieved from RemoteDepositCapture.com. pp. 1-2.

Association of German Banks, SEPA 2008: UNIFORM PAYMENT INSTRUMENTS FOR EUROPE, Berlin, Jul. 2007. Publisher: Bundesverband deutscher Banken e. V.

DCU Member's Monthly - Jan. 2008, "PC Deposit —Deposit Checks from Home!", Retrieved from the internet <https://www.mycreditunionnewslettercom/dcu/0108/pagel.html>. pp. 1-2. Copyright 2008 Digital Federal Credit Union.

WindowsForDevices.com, "Software lets camera phone users deposit checks, pay bills", Jan. 29, 2008. Retrieved from the internet <https://www.windowsfordevices.com/news/NS3934956670htm1>. 3 pages.

CNN.com/technology, "Scan, deposit checks from home", Feb. 7, 2008. Retrieved from the internet <https://www.cnn.com/2008/Tech/biztech/02/07/check.scanning.ap/index.html>. downloaded 2009, 3 pages.

eCU Technologies, "Upost Remote Deposit Solution", Retrieved from the internet <https://www.eutechnologies.com/products/upost.html>. downloaded 2009, 1 page.

The Green Sheet 2.0 :: Newswire, "Co-Op adds home deposit capabilities to suite of check imaging products", Retrieved from the internet, downloaded 2009, <https://www.greensheet.com/newswire.php?newswire_id=8799. pages 1-2.

CreativePaymentSolutions.com, "Creative Payment Solutions — WebSolution", Retrieved from the internet <http://www.creativepaymentsolutions.com/cps/financial_services/websolution/default.html>. Copyright © 2008, Creative Payment Solutions, Inc.

Wells Fargo Commercial, "Remote Deposit", Retrieved from the internet <https://www.wellsfargo.com/com/treasury_mgmt/receivables/electronic/remote_deposit>. © 1999-2008 Wells Fargo. All rights reserved.

Bruene, Jim; "Digital Federal Credit Union and Four Others Offer Consumer Remote Deposit Capture Through EasCorp", NetBanker - Tracking Online Finance. Apr. 13, 2008 9:23 Pm. Retrieved from the internet <http://www.netbankercom/2008/04/digitaliederal_credit_union_a.html> © 1995-2007, Financial !Insite, Inc.

Credit Union Journal, "The Ramifications of Remote Deposit Capture Success", Credit Union Journal - Monday, Apr. 14, 2008. Retrieved from the internet <http://www.cujournal.com/printthis.html?id=20080411EODZT57G>. 1 page.

Bruene, Jim; "CheckFree to Enable In-home Remote Check Deposits for Consumers and Small Businesses", NetBanker.com, Feb. 5, 2008 12:23 Pm. Retrieved from the internet <http://www.netbanker.com/2008/02/ checkfreeto_enable_inhome_rem.html>. © 1995-2007, Financial !Insite, Inc.

Mitek systems, "ImageNet Mobile Deposit—Provides Convenient Check Deposit and Bill Pay to Mobile Consumers", <http://www.miteksystems.com>. downloaded 2009, 2 pages.

Chiang, Chuck Chiang / The Bulletin, "Remote banking offered", Published: Feb. 1, 2006 4:00AM PST. Retrieved from the internet <http://bendbulletin.com/apps/pbcs.d11/article?AID=/20060201/BIZ0102/602010327&templ... >. 2 pages.

fBankServ, "DepositNow: What's the difference?", Copyright 2006, DepositNow.

http://www.bankserv.com/products/remotedeposit.htm, Copyright 2006, BankServ.

* cited by examiner

US 7,876,949 B1

SYSTEMS AND METHODS FOR REMOTE DEPOSIT OF CHECKS

CROSS-REFERENCE TO RELATED APPLICATIONS

This application is related by subject matter to U.S. patent application Ser. No. 11/591,014, U.S. patent application Ser. No. 11/590,971, U.S. patent application Ser. No. 11/591,247, U.S. patent application Ser. No. 11/590,963, U.S. patent application Ser. No. 11/591,003, and U.S. patent application Ser. No. 11/590,974, all filed on even date herewith and also entitled "Systems and Methods for Remote Deposit of Checks."

This application is also related by subject matter to U.S. patent application Ser. No. 11/321,025, U.S. patent application Ser. No. 11/321,027, U.S. patent application Ser. No. 11/320,998 all filed on Dec. 29, 2005 and entitled "Remote Deposit of Checks," and U.S. patent application Ser. No. 11/591,131 filed Oct. 31, 2006 also entitled "Remote Deposit of Checks."

BACKGROUND

As described in U.S. patent application Ser. No. 11/321,025, checks typically provide a safe and convenient method for an individual to purchase goods and/or services. To use a check, the individual usually must open a checking account, or other similar account, at a financial institution and deposit funds, which are then available for later withdrawal. To pay for goods and/or services with a check, the payor (i.e., the buyer) usually designates a payee (i.e., the seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

Checks have certain advantages over other forms of payment, such as cash. For example, while often considered the most liquid type of asset, cash also may be the least secure. Unlike a check, cash is usually freely transferable and does not have to be endorsed. Thus, the owner and possessor of cash is most often the same individual. Because cash is freely transferable, cash that is lost or stolen typically cannot be recovered. Therefore, the risks associated with cash transactions are often unacceptable, particularly with respect to transactions not conducted in person (e.g., by mail) and/or involving large sums of money. A check, on the other hand, provides a payor with more security because the check usually requires a payor to specify both the person and amount to be paid. Furthermore, as noted above, the check is usually not valid until it is properly signed by the payor. These safeguards help to reduce the risk that money will be lost and/or stolen and ensure that the proper payee receives the proper amount of money.

Cash may have other disadvantages as well. For example, because cash is freely transferable, there may be little or no verifiable transaction history. It is often desirable for a payor and/or payee to have physical proof that a particular transaction took place. This typically requires that the payor receive a receipt. However, receipts may contain errors and can be easily misplaced. In contrast, a bank processing a check will ordinarily create a transaction history, which may include the identity of the payee, the amount to be paid, the date of the payment, and the signature of the payor. This enables both a payor and payee to independently verify the accuracy of most transactions involving a payment by check.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. In addition to the time commitment that may be required, visiting a bank branch may be problematic for the payee if the bank's hours of operation coincide with the payee's normal hours of employment. Thus, the payee may be required to leave work early and/or change work schedules.

A check may pose other burdens for the payee. As noted above, a check may not be freely transferable, thereby limiting the payee's ability to use funds from the check. For example, it is usually difficult to for the payee to purchase goods and/or services using a check issued by the payor. While the check may be endorsed and accepted by a third party, such transactions are often disfavored because the third party may not know the payor and, thus, may not be willing to accept the risk that the payor has insufficient funds to cover the check. Therefore, the payee may not have access to the funds from the check until the payee deposits the check at the bank, the check has cleared and the funds have been credited to the payee's account. The payee may have to wait even longer if the payee chooses to deposit the check by mail. Therefore, there is a need for a convenient method of remotely depositing a check while enabling the payee to quickly access the funds from the check.

SUMMARY

The described embodiments contemplate a system, method and computer-readable medium with computer-executable instructions for remotely redeeming a negotiable instrument. In an embodiment, the novel method may include delivering, via a publicly accessible computer network, a software component to a customer-controlled general purpose computer. The customer is instructed to identify an account via said computer, and to provide an image of at least a front side of a check, for example by scanning the check and appropriately rotating and cropping the scanned image as necessary. The image passes from scanner or other image capture apparatus to the software component, which manages delivery to bank servers.

In another embodiment, the novel method may include receiving, at a server computer, a customer request for a customer capability to make at least one check deposit from a customer-controlled general purpose computer. The software component for facilitating a check image capture process is then delivered to the customer. A customer identification of an account for a deposit and an image of a front side of a check is received, and optical character recognition (OCR) is performed on a Magnetic Ink Character Recognition (MICR) line location of the image. The received information and OCR information can be used in completing the deposit.

In another embodiment, the novel method may include receiving a customer identification of an account for a deposit, receiving a first image of a front side of a check, wherein said first image is in a first file format, e.g. JPEG, and wherein said first image is received from a customer-controlled general purpose computer. A second image of said front side of a check may then be created by converting said first image into a second file format, e.g. a bi-tonal TIFF. A log file may be generated comprising one or more of said first image and said second image, in addition to a variety of other potentially useful information for processing and/or troubleshooting the deposit transaction.

Additional advantages and features of the invention are described below.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
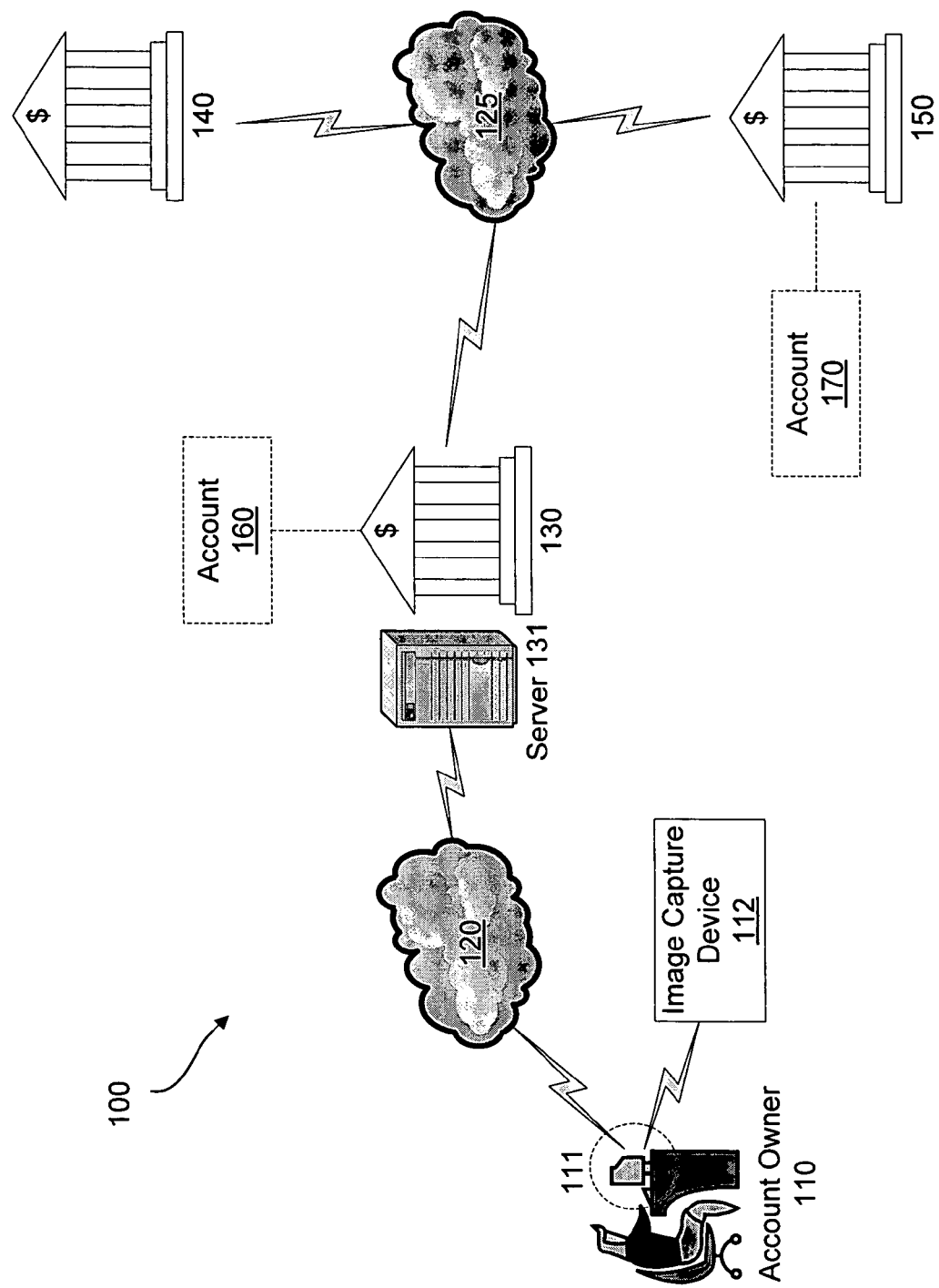
FIG. 1 illustrates a broad view of a system in which the described embodiments may be employed.

FIG. 1 illustrates an example system in which the described embodiments may be employed. System 100 may include account owner 110, e.g., a bank customer who may be located, for example, at the customer's private residence. The account owner 110 may be utilizing a customer-controlled, general purpose computer 111. A general purpose computer 111 is generally a Personal Computer (PC) running one of the well-known WINDOWS® brand operating systems made by MICROSOFT® Corp., or a MACINTOSH® (Mac) brand computer, running any of the APPLE® operating systems. General purpose computers are ubiquitous today and the term should be well understood. A general purpose computer 111 may be in a desktop or laptop configuration, and generally has the ability to run any number of applications that are written for and compatible with the computer's operating system. The term "general purpose computer" specifically excludes specialized equipment as may be purchased by a business or other commercial enterprise, for example, for the specialized purpose of high-speed, high-volume check deposits. A particular advantage of embodiments of the invention is its ability to operate in conjunction with electronics that today's consumers actually own or can easily acquire, such as a general purpose computer, a scanner, and a digital camera.

General purpose computer 111 may also be "customer-controlled." A common example of a customer-controlled computer would be a typical computer located in a private residence. The owner of such a computer typically has the power to install programs and configure the computer as they wish, subject to certain security restrictions that may be imposed by the hardware or software manufacturers. A customer-controlled computer need not be located in a private residence, however. For example, computers in college dormitories, in workplace offices, and so forth may also be considered to be "customer-controlled."

An example of a computer that would not be considered customer-controlled would be an Automatic Teller Machine (ATM) that is typically controlled by a bank or other business. Although a customer may access and utilize an ATM machine, the ATM machine is not customer-controlled because the allowed uses of the ATM machine are highly restricted. Relevant factors in determining whether a machine is customer controlled are thus the scope of operations that a customer may perform using the machine, and extent to which the customer can reconfigure the machine in some way by adding software and/or hardware components.

One of the applications that may run on a general purpose computer 111 in connection with the invention is a browser. Common browsers in use today are, for example, the popular INTERNET EXPLORER® line of browsers made by MICROSOFT® Corp., the FIREFOX® browsers distributed via the MOZILLA® open source project, and the NETSCAPE NAVIGATOR® browsers also distributed via the MOZILLA® open source project. Browsers generally allow users to point to a Uniform Resource Locator (URL), and thereby retrieve information such as a web page. For example, a browser application on computer 111 could retrieve a web page that is kept at server 131, and display the web page to the account owner 110, as is generally known and appreciated in the industry and by the general public.

Another application, or set of applications, that may run on a general purpose computer 111 in connection with the invention comprises "virtual machine" technologies such as the JAVA® virtual machine software distributed by SUN MICROSYSTEMS® Corp, and .NET® Framework distributed by MICROSOFT® Corp. In general, such applications facilitate execution of computer programs in a variety of computing environments. For example, a JAVA® applet is a computer program (which may be alternatively referred to herein as a "software component") that can execute on any computer running the JAVA® virtual machine software. The applet may be provided to virtual machine software in a "source code" format, and may be compiled by a "just in time" compiler, so as to put the applet in a form that can be executed by the hardware associated with the particular computing device. These technologies are known in the art and may be utilized in connection with certain embodiments of the invention as described herein.

An image capture device 112 may be communicatively coupled to the computer 112. Image capture device may be, for example, a scanner or digital camera. Computer 111 may comprise software that allows the user to control certain operations of the image capture device 112 from the computer 111. For example, modern scanner users may be familiar with the TWAIN software often used to control image capture from a computer 111. Similarly, digital cameras often ship along with software that allows users to move images from the camera to a computer 111, and may also provide additional functions, such as photo editing functions crop and rotate.

Financial institutions 130, 140 and 150 may be any type of entity capable of processing a transaction involving a negotiable instrument. For example, financial institutions 130, 140 and 150 may be a retail bank, investment bank, investment company, regional branch of the Federal Reserve, clearinghouse bank and/or correspondent bank. A negotiable instrument is usually a type of contract that obligates one party to pay a specified sum of money to another party. By way of example, and not limitation, negotiable instruments may include a check, draft, bill of exchange, promissory note, and the like.

Financial institution 130 is illustrated as associated with a server 131. Financial institution 130 may maintain and operate server 131 for the purposes of communicating with customers such as 110. Alternatively, such server may be maintained and operated by one or more third party vendors who act under the instructions of the financial institution 130, but possess skills and resources that may be more effective in competent operation of electronics. Such arrangements are well known in the industry and in this case the server 131 is nonetheless considered to be "associated" with the financial institution 130.

Account owner 110 may be an individual who owns account 160, which may be held at financial institution 130. As such, account owner 110 may be described as a customer of financial institution 130. Account 160 may be any type of account for depositing funds, such as a savings account, checking account, brokerage account, and the like. Account owner 110 may communicate with financial institution 130 by way of communication network 120, which may include an intranet, the Internet, a local area network (LAN), a wide area network (WAN), a public switched telephone network (PSTN), a cellular network, a voice over internet protocol (VoIP) network, and the like. Account owner 110 may communicate with financial institution 130 by phone, email, instant messaging, facsimile, and the like.

In one contemplated embodiment, network 120 is a publicly accessible network such as the Internet, which can presently be accessed from many private residences and many public places such as college campuses, airports, coffee shops, and restaurants throughout the United States as well as many other countries of the world. A variety of technologies are available to establish secure connections over such a public network, so that data transmitted between computer 111 and a server 131 associated with the institution 130 remains either inaccessible or indecipherable by third parties that may intercept such data. The invention may make use of any such security technologies.

Financial institutions 130, 140 and 150 may communicate with each other via a network 125. Network 125 may be a publicly accessed network such as 120. Alternatively, network 125 may have certain characteristics that differ from network 120, due to the different requirements of bank-to-bank communications. For example, one might envision certain security features and access restrictions being more important in bank-to-bank communications.

In an embodiment, account owner 110 may wish to deposit a check that is drawn from account 170 at financial institution 150. Account owner 110 may deposit the check into account 160 by converting the check into electronic data and sending the data to financial institution 130. Aspects of the invention may thus comprise systems and methods carried out by the account owner 110 and his computer 111. Aspects of the invention may also comprise systems and methods carried out by the financial institution 130 and their server 131 or other electronics that facilitate and enable such deposit by the account owner 110.

For example, account owner 110 may convert the check into a digital image by scanning the front and/or back of the check using image capture device 112. Account owner 110 may then send the image to financial institution 130 using the systems and methods described herein. Please refer to FIG. 2 and corresponding description for a detailed exemplary embodiment of systems and methods for facilitating and processing a check deposit transaction. Upon receipt of the image, financial institution 130 may credit the funds to account 160. Financial institution 130 may clear the check by presenting the digital image to an intermediary bank, such as a regional branch of the Federal Reserve, a correspondent bank and/or a clearinghouse bank.

For example, the check may be cleared by presenting the digital image to financial institution 140, which may be a regional branch of the Federal Reserve, along with a request for payment. Financial institution 130 and 150 may have accounts at the regional branch of the Federal Reserve. As will be discussed in greater detail below, financial institution 130 may create a substitute check using the image provided by account owner 110 and present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

Figure 2:
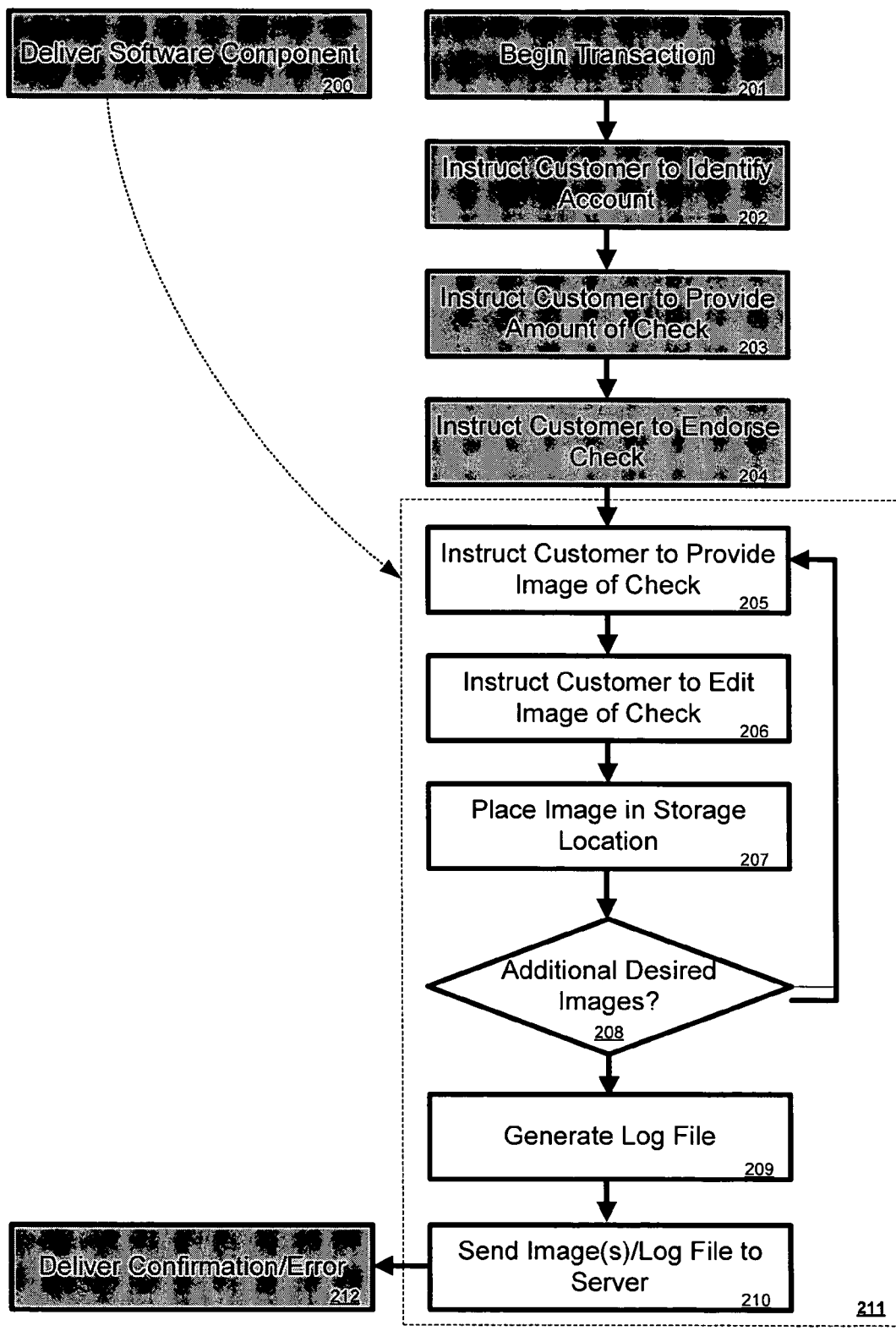
FIG. 2 illustrates a method for facilitating deposit of a check from a customer-controlled general purpose computer.

FIG. 2 illustrates a method for facilitating deposit of a check from a customer-controlled general purpose computer. The various steps of FIG. 2 may be viewed as performed by a server computer associated with a financial institution, in conjunction with a software component that operates from a customer-controlled general purpose computer. Various of the steps are contemplated as performed by the server, while various other steps are contemplated as performed by the software component.

In the embodiment illustrated in FIG. 2, the darker boxes indicate steps that are performed by the server, for example by delivering information to the user through the user's browser application. Making information available on a server to customers with a browser is considered to be effectively "delivering" such information for the purposes of this document. The lighter boxes inside 211 indicate steps that are performed by the software component, as it executes on the customer computer. Those of skill will recognize that alternative configurations are readily achievable by moving functions from server to software component or vice-versa.

The server may first deliver a software component to the customer-controlled general purpose computer 200. This may be done in response to a customer request for the capability of making deposits from his computer. In one embodiment, the financial institution may provide such capability only to customers that meet predetermined criteria of trustworthiness. For example, it can be required that the customer's accounts are in good standing, that the customer relationship has lasted a predetermined amount of time, that the customer has a predetermined number of financial service products with the financial institution (e.g. bank accounts, mortgages, insurance policies, etc.), that the customer has a predetermined level of assets with the financial institution, and so forth.

The software component may be configured to facilitate the deposit transaction in a variety of ways as illustrated herein. In one embodiment, the software component may be compatible with the JAVA® or .NET® technologies described above. Such configurations allow for widespread dissemination and successful operation in a wide variety of computing environments as may exist on customer-controlled general purpose computers.

Where the software component is written for JAVA®, .NET®, or any other such technology, it is useful in step 200 to first determine whether the customer-controlled general purpose computer has an appropriate virtual machine application installed, e.g. JAVA® Virtual Machine (JVM) or .NET® framework. If the computer does not have the appropriate application installed, such application may be automatically installed, or the customer may be directed to a location from which such application may be downloaded and installed. The software component may then be delivered 200, and should work as intended. The various other steps of FIG. 2 may now take place, or may take place at some subsequent time using the software component as previously downloaded.

After downloading or otherwise accepting the software component, and assuming the customer has an appropriate image capture device, the customer now has the capability to make deposits from his general purpose computer. For example, the customer points his browser to a bank website, where a link may be available that causes the bank server to initiate a deposit transaction 201. The customer may be asked to log in using a user name and password.

The customer may next be instructed to identify an account into which the deposit will be made 202. This can be done, for example, by providing a webpage that lists the available accounts, along with an instruction to select an account. Alternatively, a box may be provided into which the customer may type an account number, along with an appropriate instruction to type the number of the desired account. The account may be any account, and need not necessarily be the customer's own account, although it is contemplated that a large number of customer deposits may be made into the transacting customer's account, and embodiments may find it useful to restrict the allowed accounts to the customer's own accounts. In such embodiments, if the customer has just one account with the financial institution, step 202 may be eliminated because the only available allowed account would be the customer's single account.

The customer may next be instructed to identify an amount of a check or other negotiable instrument he wishes to deposit into the selected account 203. In one embodiment, this can be done similarly to step 202 by providing a webpage with a box into which the customer may type an amount, along with an appropriate instruction to type the amount of the check. The customer may also be instructed to endorse the check 204.

The customer may next be instructed to provide an image of a front side of a check 205, for example, by using an image capture device. In one embodiment, the customer may be instructed to place the check face down on a flatbed scanner, and may further be instructed as to the location and orientation of the check on the scanner. If the customer is instructed to take a digital photograph of the check using a digital camera, the customer may be instructed as to the position and orientation of the check, lighting, angle of camera, distance and focal length (zoom) of camera, and so forth. The software component may be useful at this point in providing a graphical illustration of just how the customer should provide the image. The customer may further be given instructions as to how to activate the image capture device and/or move the image from the device to the general purpose computer.

In one embodiment, it is contemplated that the software component allows for control of the transaction and transaction data throughout the various aspects thereof. For example, the software component may open a folder in a storage location, such as the hard drive of the general-purpose computer, and may work in conjunction with any software that interfaces with the image capture device to deposit the image in such folder. This may advantageously be conducted in a secure manner to prevent any unwanted image diversion or tampering. The hard drive of the general-purpose computer is considered to be a storage location that is controlled by said customer-controlled general purpose computer, but other storage locations such as disk drives, networked drives, and so forth may also be effectively controlled by the general purpose computer.

The software component may itself perform operations such as opening a folder and placing the images therein, or may effectively achieve such operations by instructing the customer and/or other applications to do so. All software operates to some extent under the control and with the support of an operating system running on the general purpose computer, and such support is of course appropriate in embodiments of the invention.

The software component may next cause the image of the check to be presented to the customer for editing, e.g. by asking the customer to crop and/or rotate the check image to a predetermined orientation 206. In embodiments using a scanner, an image of the entire scanner bed, or some otherwise too large image may be generated. If the check was placed in the top left corner of the scanner bed, the customer may be asked to indicate the bottom right corner of the check image, and the image may be cropped to contain only the check image, thereby removing a portion of the originally obtained image.

An appropriately edited image of the check may be placed in the storage location 207. If further images are necessary 208, steps 205-207 may be repeated as necessary. For example, the customer may be instructed to endorse and provide an image of the back side of a check. To ensure the check is appropriately voided, the customer may be asked to write "void" on the check and re-scan the front of the check.

A log file may be generated 209 to collect data for processing or troubleshooting the deposit transaction. The log file is discussed further in connection with FIGS. 4 and 5. The log file may be placed in the storage location along with the various images of the check.

Once the desired images are collected and edited, they may be delivered to the server for processing the deposit 210. The log file may also be delivered at this time. Once such files are delivered, they may be deleted from the customer's general purpose computer. If the server determines that the delivered images and any corresponding data are sufficient to go forward with the deposit, the customer's account may be provisionally credited, and a confirmation page may be delivered to the customer via the customer's browser application 212. The customer may be instructed to destroy, e.g. by shredding, the actual physical check or other negotiable instrument. Under the current check handling procedures in the United States, the physical check is not necessary in processing a deposit, nor is it necessary to keep the original check in bank or customer records.

Figure 3:
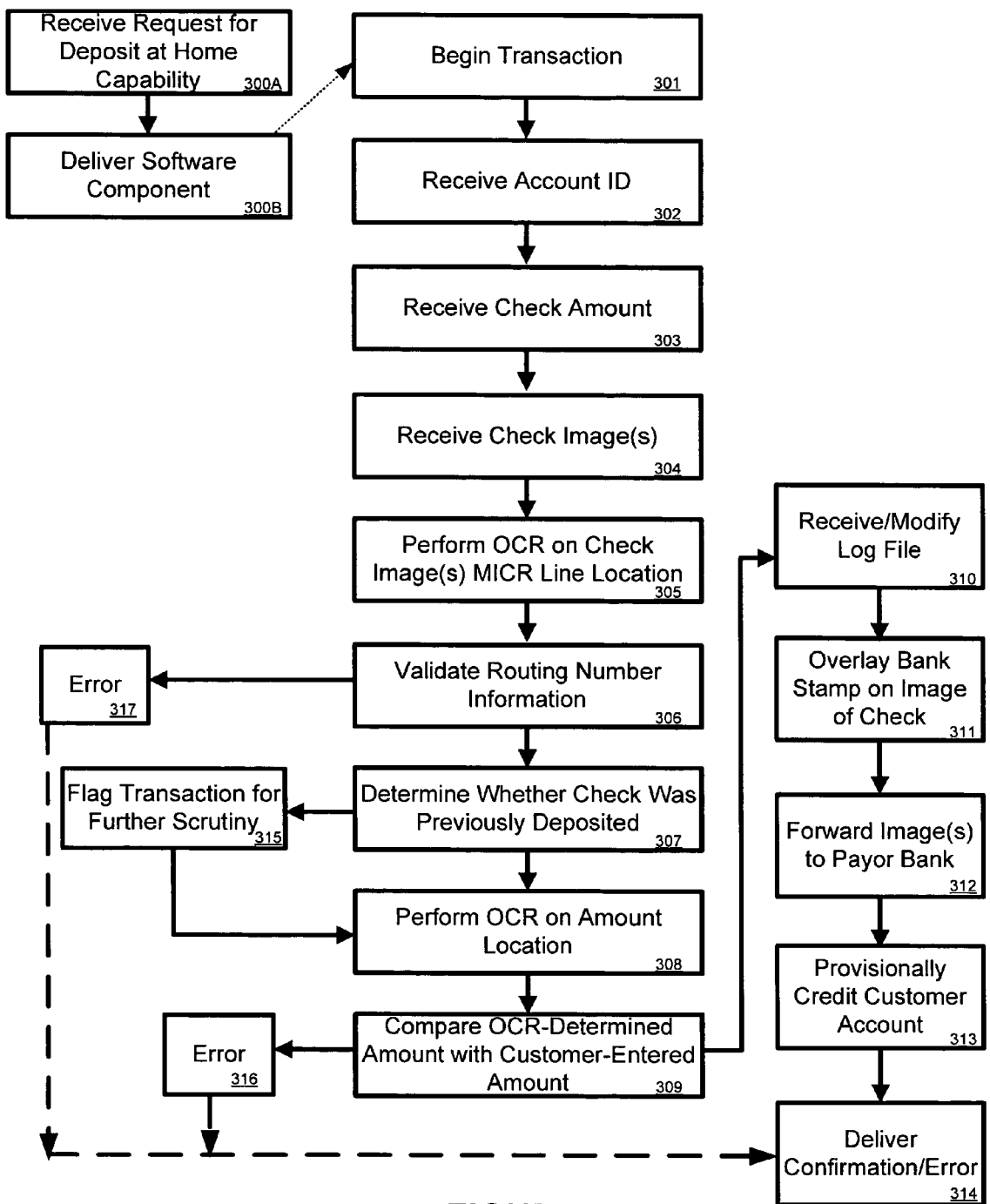
FIG. 3 illustrates a method for processing a check deposit.

FIG. 3 illustrates a method for processing a check deposit. The method of FIG. 3 is designed to complement that of FIG. 2 and to illustrate exemplary steps that may be carried out by a server or other electronics operated by a financial institution before, during, and after the various steps of FIG. 2 are carried out.

In general, as illustrated in FIG. 3, such server may receive a request for deposit at home capability 300A, and in response to such request may deliver a software component to the requesting customer 300B. As with FIG. 2, intermediate steps may comprise determining if the customer is in fact eligible for a remote deposit program, and ensuring the customer has an appropriate virtual machine environment installed on their general purpose computer—in embodiments where the software component requires such an environment.

A transaction may be initiated 301 upon receiving a customer indication that a deposit transaction is desired. The customer is instructed to identify an account per FIG. 2, and as a result the financial institution electronics receive an account identifier (ID) 302. Similarly, financial institution electronics receive check amount 303. At this juncture the software component handles image capture processes, which may or may not involve the server until such time as check image(s) are received 304.

Upon receipt of check images, an Optical Character Recognition (OCR) process may be invoked to determine certain information about the check. For example, OCR may be performed on the check's MICR line location 305 to determine information such as payor bank routing number, account number, and check number. The bank routing number may then be validated 306 against a list of valid routing numbers to ensure that it corresponds to a legitimate bank, and in some embodiments, to ensure it corresponds to a United States bank. In one embodiment, the OCR is conducted in real time, i.e. prior to confirming the deposit transaction for the customer, so as to validate some initial deposit information immediately, and thereby filter transactions that may result in errors were the OCR to be conducted at some later time. In other embodiments, certain efficiencies may be gained by performing "batch" OCR operations at some later time.

In one embodiment, an OCR process can conveniently be applied to an image of a back side of a check in addition to performing OCR on the image of the front side of said check. One problem that may occur involves customer submission of two front images, instead of one front image and one back image. OCR may be performed on a MICR line location of an alleged image of a back side of said check to confirm that said alleged image of a back side of said check does not bear a MICR line. If no MICR line is present in such location then it is more likely that the alleged image of a back side of said check is in fact the back, and not the front, of the check.

Another advantageous use of OCR is on the endorsement location on the back of a check. By performing OCR, it may be possible in some embodiments to determine that the signature matches that of the payor or drafter of the check. However, often signatures are illegible. Thus in one embodiment it is advantageous to determine that some mark or signature is present in the endorsement location on the back of the check, without conducting any further signature identification procedures.

If the routing number determined using OCR cannot be validated, an error may result 317, and the deposit transaction can be aborted. An error message can be delivered to the customer 314, explaining a reason that the transaction could not be processed.

A duplicate checking procedure may be carried out to determine whether the check was previously deposited 307. Determining whether a check is a duplicate can be processor- and memory-intensive, however, so this operation may be initially performed in a manner designed for speed and rough, if not complete, accuracy. More thorough duplicate detection may be performed after the deposit transaction is confirmed 314. For example, in one embodiment, an initial duplicate detection process may proceed as illustrated in FIG. 6.

Figure 6:
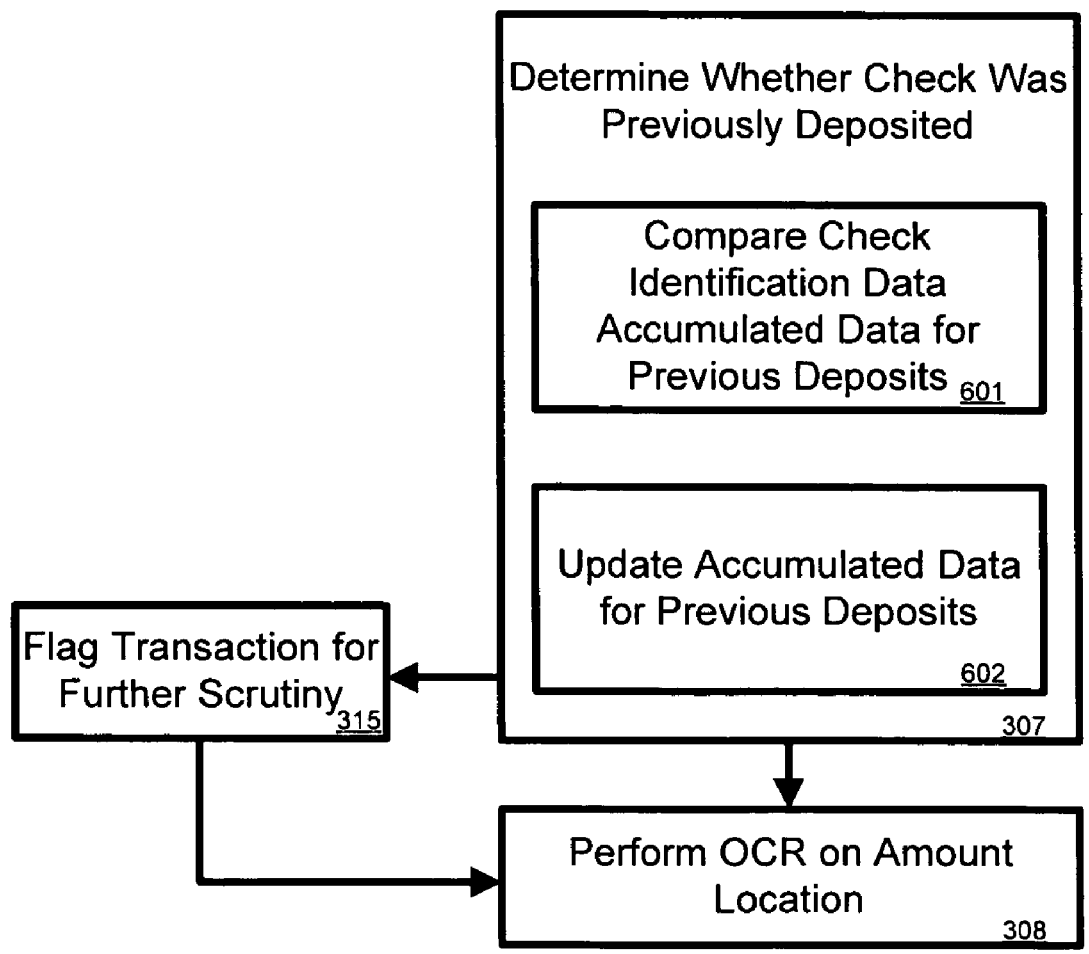
FIG. 6 illustrates an exemplary duplicate checking procedure.

FIG. 6 expands upon step 307 as illustrated in FIG. 3. To undertake at least an initial, provisional duplicate checking procedure, check identification data may be compared against accumulated data for previous check deposits 601. This may entail, for example, comparing check MICR line information against MICR lines for all checks deposited into the transacting customer's account for the previous two weeks. Other embodiments are also possible, for example one might ensure a MICR line does NOT comprise a money amount, because a money amount in a MICR line indicates a check was already deposited. On might scan for a return stamp on the front or back of the check. One might also look for a number 4 in position 44 of the MICR line. Placing a 4 in position 44 is only done when images of checks are made by banks. The fact that an image was made in general implies that the check was already presented to a bank, and therefore it may be advantageous to ensure the check was not presented twice.

According to step 602, if the check deposit proceeds, appropriate check identification data for the deposited check may be added to the accumulated data for previous deposits, so that it too will be available for use in subsequently identifying duplicate deposit attempts.

There are numerous possibilities for false positives in duplicate checking 307. Because of this, it is advantageous in some embodiments to proceed with a deposit transaction despite the fact that a duplicate may be initially identified. As illustrated in FIG. 3, if a duplicate is detected, the transaction may be flagged for further scrutiny 315 at a later time, and the transaction may be allowed to proceed. If a duplicate is not detected, the transaction need not be flagged as abnormal and step 315 is unnecessary.

Returning to FIG. 3, OCR may further be performed on a check amount location 306, and the amount as determined using OCR may be compared against the customer-entered amount received pursuant to step 303. If the amounts do not match, an error 316 can result, terminating the transaction and delivering appropriate information concerning the error to the customer 314. OCR may further be performed on any other aspects of the check image at this time if it is advantageous in specific embodiments to do so.

The server may further receive and modify a deposit transaction log file 310. Alternative versions of the images received may be generated an placed in the log file. Check 21 regulations require a bi-tonal TIFF formatted image, which is generally a low-quality image format as compared to other available image formats. Therefore, it is desirable in some embodiments to retain both a "good" image in an initial format, e.g., in a JPEG format, as well as the modified bi-tonal TIFF required by Check 21. This way, if any troubleshooting is necessary, a good image of the check remains available.

In some embodiments, a bank stamp may be overlaid on the image of the back of the check 311, just as if the check was physically deposited at a bank. Appropriate images may be forwarded to the payor bank for payment 312, and meanwhile, the customer's account may be provisionally credited in the amount of the check 313. A confirmation can be delivered to the customer 314.

At 312, in one embodiment, the bank may forward an image or images to a payor bank. Provisionally crediting the customer account 513 and delivering a confirmation to the customer-controlled general purpose computer 514 may be done before, after, or contemporaneously with step 312. In general, a provisional credit is subject to the check clearing, e.g., by receiving at the payee bank some confirmation that the check will be satisfied from the payor bank. This confirmation from the payor bank can take some time. Provisionally crediting the customers account 513 and sending the confirmation 514 can assure the customer that the transaction will proceed, even though it may not ultimately be successful.

In one embodiment, forwarding an image or images to a payor bank 512 may be performed pursuant to an Automated Clearinghouse (ACH) transaction. ACH transactions typically include payment instructions to debit and/or credit an account. Banks often employ ACH service providers to settle ACH transactions. Examples of ACH service providers include regional branches of the Federal Reserve and the Electronic Payments Network (EPN).

In an ACH transaction, the payee's (customer's) bank may be referred to as the originating depository financial institution (ODFI). Upon receipt of appropriate check information, the payee's bank may credit funds to the payee's account and generate an ACH debit entry to the payor's account, which may be presented to the ACH service provider for processing.

The ACH service provider may process the debit entry by identifying the account and bank from which the check is drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the payee's bank. The payor's bank may then debit the payor's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

The bank may process the ACH debit entry, substitute check, and/or electronic image. As noted above, the bank may present the ACH debit entry to an ACH service provider (e.g., EPN), which may be responsible for settling the transaction between the payee's bank and the payor's bank. The bank also may convert the digital image into a substitute check and present the substitute check to an intermediary bank (e.g., a regional branch of the Federal Reserve) to complete the check clearing process. If the payor's bank and the payee's bank are the same, the transaction can be handled internally at the payor bank by simply debiting the account of one customer and crediting the account of another. Thus, an intermediate step may comprise identifying if the payor bank and the payee bank are one and the same, or otherwise operating in a closely cooperative manner.

Figure 4:
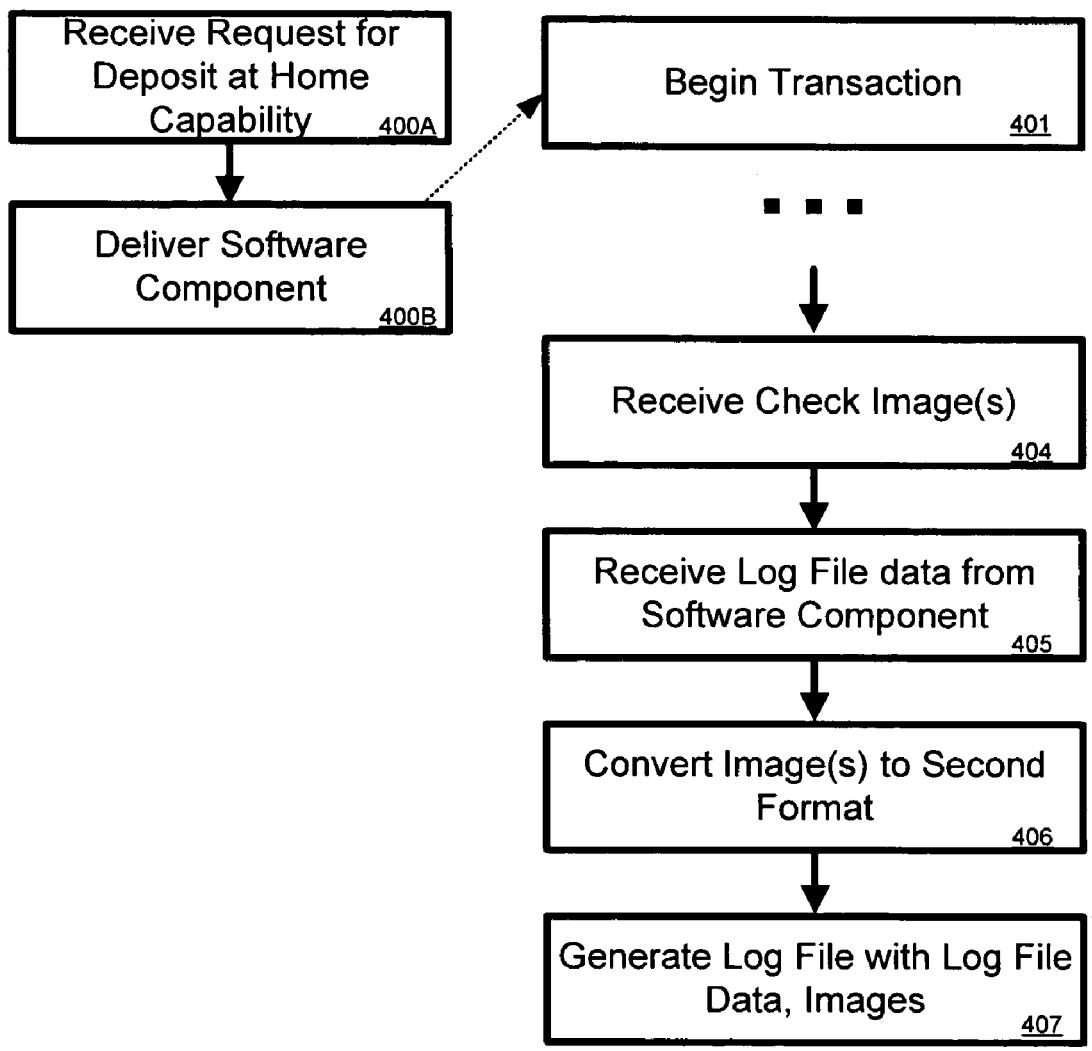
FIG. 4 illustrates a method for processing check deposits, with particular applicability to generation and use of an appropriate log file.
Figure 5:
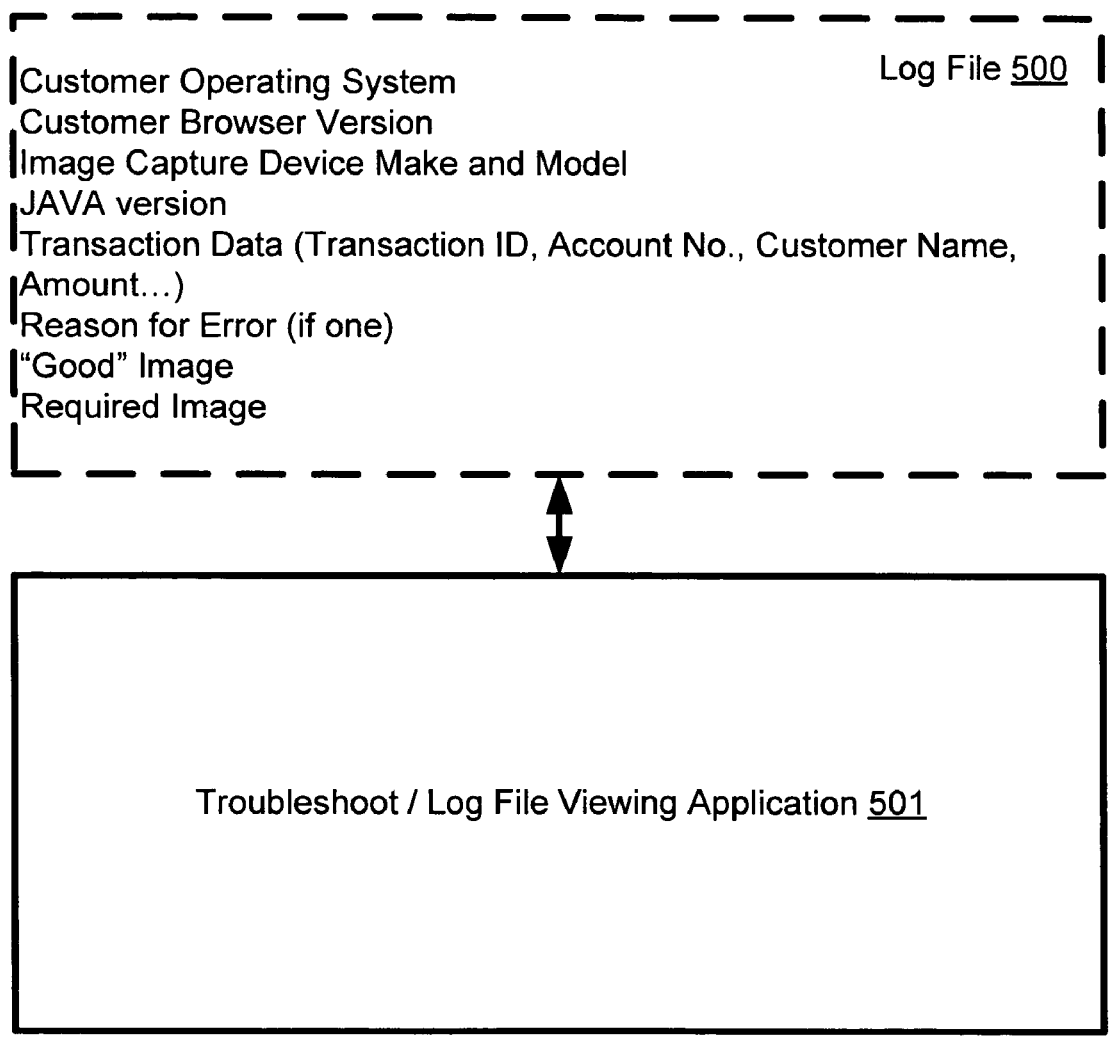
FIG. 5 illustrates an exemplary log file and log file viewing application.

FIGS. 4 and 5 are directed to methods for processing check deposits, with particular applicability to generation and use of an appropriate log file. With reference to FIG. 4, a bank server and/or related electronics can receive a request for "deposit at home" or remote deposit capability 400A, and deliver a software component to a customer's general purpose computer 400B as described above. In general, a transaction may begin 401 and proceed as described with regard to FIGS. 2 and 3. The three dots in FIG. 4 are a general reference to steps of a deposit transaction that may occur. In the course of such transaction, a log file maybe generated, for example by a software component on a customer-controlled general purpose computer. The log file comprises log file data, and may be delivered to the server by the software component. Log file data may comprise, for example the data illustrated in the log file 500 in FIG. 5.

In one embodiment, a financial institution server may receive one or more check images 404, and may receive log file data from the software component 405. Other embodiments are will be readily recognized as possible, such as placing the images in the log file and combining steps 404 and 405, or streaming raw data absent any sort of file structure, and allowing the server to generate a file upon receipt of such data.

Step 406 comprises converting an image from a first format to a second format. In one embodiment, the first format is, for example, a relatively high-quality Joint Photographic Experts Group (JPEG) format, such as might be initially generated by the image capture device used by a customer in producing the check image. Due to its high quality, such an image provides a good tool for subsequently troubleshooting a deposit transaction. For example, it might be readily determined if the image represents a check that was previously deposited by simple human inspection of both images.

The second format is, in one embodiment, a format that complies with bank-to-bank image transfer requirements. Currently, the image format required by Check 21 is the bi-tonal Tag Image File Format (TIFF). Therefore the second format may be, for example, a bi-tonal Tag Image File Format (TIFF).

In a further embodiment, the images in both formats can be retained, for example, in the log file. Each image is useful for its own purpose—the first for troubleshooting, the second for regulatory compliance and business necessity. Thus, step 407 illustrates generating a log file with log file data and images. The term "generating" may be exchanged for "modifying" in some embodiments, e.g. where the log file was received from the software component, and simply modified to further comprise an additional check image that is in a different format. The generating step 407 may be broken into a plurality of steps, each step for generating an aspect of log file 500 in FIG. 5.

Referring now to FIG. 5, an exemplary log file 500 is illustrated and examples of data that may be placed in the log file 500 are listed. In general, a log file can advantageously comprise an identification of an image capture device used to generate an image of a check, for example a scanner make and model, digital camera make and model, or other identification information such as an image capture device Global Unique Identifier (GUID). This identification information may also include an identification of software associated with the device, for example the familiar TWAIN drivers that can be used with scanners, digital cameras, and other image capture devices.

Furthermore, with regard to log file 500, a customer operating system can comprise an identification of the operating system used by the customer's general purpose computer. A customer browser version can comprise the browser used by the customer's general purpose computer. Image capture device make and model may comprise the type of image capture device, manufacturer, and model number. "JAVA version" may comprise a version of the JAVA virtual machine software used by the customer's general purpose computer, or, if .NET technologies are used, the version of the .NET Framework. Transaction data may comprise information such as transaction ID, account number, customer name, amount of deposit, check routing number, check number, check account number, and so forth. Reason for error may be provided if an error occurred—for example, due to an invalid check routing number, different amounts identified by the customer and the OCR process, etc. Finally, the "good" image (customer generated image) and the "required" image (required for bank-to-bank image transfer) may also be included.

The log file 500 may be consumed by a troubleshooting or log file viewing application 501. Such an application may be provided to financial institution employees to view log files and solve problems associated with particular deposits. The application 501 may also collect statistical information and the like regarding all log files.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the disclosed embodiments.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A computer readable medium storing computer executable instructions issuable by a processor to:
   receive, at a depositor-owned computer device communicatively coupled to an image capture device, a remote deposit component from a financial institution;
   obtain an identification of the image capture device used to generate an image of a check and an identification of a customer check deposit account;
   generate a log file comprising information associated with a check deposit transaction, said log file comprising:
      the identification of the image capture device used to generate the image of the check, and
      the identification of the customer check deposit account;
      an identification of a browser application instantiated on the general purpose depositor-owned device; and
      an identification of a virtual machine framework instantiated on the general purpose depositor owned device;
   send the generated log file to the financial institution via the remote deposit component.

2. The computer readable medium of claim 1, wherein said identification of the image capture device comprises a scanner make and model.

3. The computer readable medium of claim 1, wherein said identification of the image capture device comprises a digital camera make and model.

4. The computer readable medium of claim 1, wherein said identification of the image capture device comprises unique identifier associated with said image capture device.

5. The computer readable medium of claim 1, said log file further comprising an identification of a customer associated with said customer account.

6. The computer readable medium of claim 1, said log file further comprising an identification of an operating system associated with a customer controlled general purpose computer associated with said image capture device.

7. The computer readable medium of claim 1, said log file further comprising an identification of an amount of said check.

8. The computer readable medium of claim 1, said log file further comprising said image of said check.

9. A processor-implemented method for generating a log file comprising information associated with a check deposit transaction, said method comprising:
   receiving, at a depositor-owned computer device communicatively coupled to an image capture device, a remote deposit component from a financial institution;
   obtaining an identification of the image capture device used to generate an image of a check and an identification of a customer check deposit account;
   generating by a processor a log file including the identification of the image capture device used to generate the image of the check, an identification of a browser application instantiated on the general purpose depositor-owned device, an identification of a virtual machine framework instantiated on the general purpose depositor owned device and the identification of the customer check deposit account; and
   sending the generated log file to the financial institution via the remote deposit component.

10. The method of claim 9, wherein said identification of the image capture device comprises a scanner make and model.

11. The method of claim 9, wherein said identification of the image capture device comprises a digital camera make and model.

12. The method of claim 9, wherein said identification of the image capture device comprises unique identifier associated with said image capture device.

13. The method of claim 9, further comprising placing an identification of a customer associated with said customer account in said log file.

14. The method of claim 9, further comprising placing an identification of an operating system associated with a customer controlled general purpose computer that is in turn associated with said image capture device in said log file.

15. The method of claim 9, further comprising placing an identification of an amount of said check in said log file.

16. The method of claim 9, further comprising placing said image of said check in said log file.

17. A system for generating a log file comprising information associated with a check deposit transaction, comprising:
- a subsystem for receiving, at a depositor-owned computer device communicatively coupled to an image capture device, a remote deposit component from a financial institution;
- a subsystem for obtaining an identification of the image capture device used to generate an image of a check and an identification of a customer check deposit account;
- a subsystem for generating a log file including the identification of the image capture device used to generate the image of a check, an identification of a browser application instantiated on the general purpose depositor-owned device, an identification of a virtual machine framework instantiated on the general purpose depositor owned device and the identification of the customer check deposit account; and
- a subsystem for sending the generated log file to the financial institution via the remote deposit component.

18. The system of claim 17, wherein said identification of the image capture device comprises a scanner make and model.

19. The system of claim 17, wherein said identification of the image capture device comprises a digital camera make and model.

20. The system of claim 17, wherein said identification of the image capture device comprises unique identifier associated with said image capture device.

21. The system of claim 17, further comprising a subsystem for placing an identification of a customer associated with said customer account in said log file.

22. The system of claim 17, further comprising a subsystem for placing an identification of an operating system associated with a customer controlled general purpose computer that is in turn associated with said image capture device in said log file.

23. The system of claim 17, further comprising a subsystem for placing an identification of an amount of said check in said log file.

24. The system of claim 17, further comprising a subsystem for placing said image of said check in said log file.

* * * * *